United States Patent
Freller et al.

(10) Patent No.: US 12,187,002 B2
(45) Date of Patent: Jan. 7, 2025

(54) METHOD AND EVALUATION DEVICE FOR MONITORING A VULCANIZATION PROCESS OF A VEHICLE TIRE IN A TIRE HEATING PRESS

(71) Applicant: Siemens Aktiengesellschaft, Munich (DE)

(72) Inventors: Robert Freller, Lauf (DE); Shehjar Kaul, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 182 days.

(21) Appl. No.: 17/886,532

(22) Filed: Aug. 12, 2022

(65) Prior Publication Data

US 2023/0049046 A1 Feb. 16, 2023

(30) Foreign Application Priority Data

Aug. 16, 2021 (EP) .................................. 21191436

(51) Int. Cl.
  *B29D 30/06* (2006.01)
  *F24H 15/148* (2022.01)
  *G01M 99/00* (2011.01)

(52) U.S. Cl.
  CPC ..... *B29D 30/0662* (2013.01); *B29D 30/0654* (2013.01); *F24H 15/148* (2022.01); *G01M 99/002* (2013.01); *B29D 2030/0659* (2013.01); *B29D 2030/0667* (2013.01); *B29D 2030/0675* (2013.01)

(58) Field of Classification Search
  CPC ............................................. B29D 2030/0675
  See application file for complete search history.

(56) References Cited

U.S. PATENT DOCUMENTS

| | | |
|---|---|---|
| 4,044,600 A | 8/1977 | Claxton et al. |
| 4,371,483 A | 2/1983 | Mattson |
| 7,987,697 B2 | 8/2011 | Pickel |
| 2005/0119785 A1 | 6/2005 | Magill et al. |
| 2010/0005863 A1 | 1/2010 | Pickel |
| 2010/0007038 A1 | 1/2010 | Mitamura et al. |

FOREIGN PATENT DOCUMENTS

| | | |
|---|---|---|
| CN | 110722818 | 1/2020 |
| WO | 2013099371 | 7/2013 |

OTHER PUBLICATIONS

EP Search Report dated Jan. 28, 2022 based on EP21191436 filed Aug. 16, 2021.

*Primary Examiner* — John J DeRusso
(74) *Attorney, Agent, or Firm* — Cozen O'Connor

(57) ABSTRACT

Evaluation device and method for monitoring a vulcanization process of a vehicle tire in a tire heating press, wherein at least one sensor value and/or at least one control variable of the tire heating press is acquired, where the sensor value and/or the control variable is fed to an evaluation device that includes an ML model, and the evaluation device and/or the ML model outputs a warning notification when an evaluation of the at least one sensor value and/or the at least one control variable by the evaluation device reveals that there is a defect or an anomaly with the tire heating press or at least part of the tire heating press, or that there will be a defect or an anomaly with the tire heating press or at least part of the tire heating press in the foreseeable future.

21 Claims, 5 Drawing Sheets

METHOD AND EVALUATION DEVICE FOR MONITORING A VULCANIZATION PROCESS OF A VEHICLE TIRE IN A TIRE HEATING PRESS

BACKGROUND OF THE INVENTION

1. Field of the Invention

The present invention relates to a method and evaluation device for monitoring a vulcanization process of a vehicle tire in a tire heating press, where the tire heating press particularly comprises an elastic bladder that configured to support a vulcanization process of a vehicle tire located in the tire heating press, and where at least one sensor value and/or at least one control variable of the tire heating press is acquired.

2. Description of the Related Art

U.S. Pat. No. 7,987,697 B2 discloses, for example, a method for the process control of a vulcanization process of a vehicle tire, where during the vulcanization process, nitrogen is additionally admixed to the gas used to inflate the bladder. If the bladder then has a leak, then the nitrogen can be detected in the region between the bladder and the tire to be vulcanized. A corresponding detection system may thereby be used to detect a leak in the bladder.

One disadvantage of such a conventional method is that the tire heating press needs to be expanded in terms of structure and equipment in order to be able to detect a corresponding leak in the bladder of the press. Furthermore, in addition to the normal process gases, additional further gas is also required, this further increasing outlay and costs for a corresponding tire heating press.

SUMMARY OF THE INVENTION

In view of the foregoing, it is therefore an object of the present invention is therefore to a method and/or system that reduces the outlay in terms of equipment and/or construction for performing installation monitoring and/or process control for a tire heating press in comparison with the conventional method and/or system.

This and other objects and advantages are achieved in accordance with the invention by a method for monitoring a vulcanization process of a vehicle tire in a tire heating press, where at least one sensor value and/or at least one control variable of the tire heating press is acquired and wherein, furthermore, the at least one sensor value and/or the at least one control variable is fed to an evaluation device for evaluation, the evaluation device comprises an ML model configured via a machine learning method, and the evaluation device and/or the ML model outputs a warning notification when an evaluation of the at least one sensor value and/or of the at least one control variable by the evaluation device reveals that (i) there is a defect or an anomaly with the tire heating press or at least part of the tire heating press, or that (ii) there will be a defect or an anomaly with the tire heating press or at least part of the tire heating press in the foreseeable future.

Provision may furthermore be made in this case for a warning notification to be output when an evaluation of the at least one sensor value and/or of the at least one control variable by the evaluation device using the ML model reveals (i) that there is a defect or an anomaly with the tire heating press or at least part of the tire heating press, or (ii) that there will be a defect or an anomaly with the tire heating press or at least part of the tire heating press in the foreseeable future.

The method may, for example, be configured such that only sensor values from sensors that are already present in the tire heating press are used. Control variables may also, for example, be taken from control devices of the tire heating press that are provided as standard in the tire heating press. This thus achieves a considerably reduced outlay in terms of equipment and/or construction in comparison with the prior art in order to implement process control in a tire heating press, since for example at least no dedicated hardware, inter alia, is needed for this purpose. It is thus possible to implement a method in accordance with the present disclosure, for example, more easily in an existing tire heating press.

Using an ML model further simplifies the use of sensors that are, for example, already provided per se in the tire heating press because appropriate training or an appropriate configuration of such an ML model makes it possible to adapt the recognition of when, for example, a corresponding problem or anomaly occurs, or will possibly occur, to the specific characteristics of the sensor system that is installed. This also contributes to further reducing the outlay in terms of equipment and/or construction for performing process control for a tire heating press.

In one advantageous embodiment, the at least one sensor value and/or the at least one control variable is acquired during a vulcanization process of the vehicle tire located in the tire heating press. The vulcanization process may in this case, for example, comprise the following steps: Loading the tire heating press with a green tire of the vehicle tire, vulcanizing the vehicle tire and removing the vulcanized vehicle tire from the tire heating press.

Provision may furthermore be made for the at least one sensor value and/or the at least one control variable to be acquired during a downtime, a preparation time and/or a post-processing time of the tire heating press. The downtime of the tire heating press may in this case, for example, be configured as a time in which no vehicle tire is vulcanized in the tire heating press. A preparation time may, for example, be configured such that the tire heating press is prepared for the vulcanization of vehicle tires in this time. A post-processing time may be configured such that, in this time, the tire heating press transitions from vulcanizing a vehicle tire to a downtime.

Provision may also be made for the at least one sensor value and/or the at least one control variable to be acquired during a separate analysis method sequence of the tire heating press. The analysis method sequence may in this case be configured such that it is particularly advantageously possible to detect anomalies or defects with the tire heating press or parts thereof (or predict such anomalies or defects) by evaluating the at least one sensor value or the at least one control variable by way of the evaluation device, for example, using the ML model.

A tire heating press, also referred to as vulcanizing press or curing press, is understood to be a machine or installation that is configured to vulcanize vehicle tires. This method step during the production of vehicle tires is a curing step in which the corresponding vehicle tire is given its final form. In this curing process, it is vulcanized at an appropriate pressure and an appropriate temperature for a specific time. During this operating step, the raw rubber is converted into flexible and elastic rubber. The tire is also given its profile and its sidewall markings in a corresponding mold of the vulcanizing press or the tire heating press.

Such a vulcanizing press usually comprises one or two molds, which each can receive what is known as a green tire. Such a vulcanizing press generally comprises duct systems for hot gases, liquids or vacuum and conveyor belts for transporting the green tires and the fully vulcanized vehicle tire in and out.

During a vulcanization process of a green tire in such a tire heating press, what is known as a bladder is then generally located in the inner region of the green tire, in a manner similar to a bicycle tube, and a hot gas or a hot liquid is then fed at high pressure to this bladder. The bladder thereby presses the green tire into the mold, with the tire profile and markings then, for example, being impressed, and also triggers the vulcanization process of the tire through the high temperature. Following the vulcanization process, the vehicle tire, which is now vulcanized, is removed from the corresponding mold and fed to the next process step of the tire production.

The at least one sensor value may for example be a digital or analog value delivered by a sensor. The value may in this case for example be delivered directly by the sensor or else following appropriate pre-processing or digital-to-analog conversion or analog-to-digital conversion. Sensors may in this case be any type of sensors, such as temperature sensors, pressure sensors, flow sensors, fill level sensors, speed sensors, meters, acceleration sensors or comparable sensors. A sensor may furthermore also be configured as a software sensor or virtual sensor.

The at least one sensor value may, for example, be a value from a sensor that was acquired at a particular time, such as during a vulcanization process or otherwise a specific analysis method sequence. The at least one sensor value may furthermore be configured as multiple sensor values, where each of the multiple sensor values may originate from a different sensor and, for example, have been acquired at a particular, for example, predefined or predefinable time, such as during a vulcanization process or otherwise during a specific analysis method sequence.

The at least one sensor value may furthermore configured as one or more time series of values from one or more sensors, where, for example, a time series from a sensor may be received at regular times or else at particular, fixedly predefined times with different time intervals, such as during a vulcanization process or else of a specific analysis method sequence.

The at least one sensor value may also comprise combinations of values in accordance with the disclosed embodiments, such as from one or more in accordance with the disclosed embodiments.

The control variable of the tire heating press may, for example, be an analog or digital value, a command, a sequence of commands or else a message that is transmitted, for example, from a control device, for example, to an actuator or a further control device of the tire heating press. The control device may in this case for example be part of the tire heating press or else be located outside the tire heating press. An actuator may be, for example, a motor, a drive, a regulator, a valve, a display device, a pump, a valve plate or a comparable device.

A control device may be, for example, a computer, a programmable logic controller, a modular programmable logic controller, a controller, a microcontroller, a decentralized peripheral device or a comparable device.

The analog or digital value or command may in this case be transmitted from the control device to the actuator or the further control device of the tire heating press, for example, via a single-wire line, a two-wire line, a field bus or a comparable wired or wireless communication link.

A control device may quite generally be any type of computer or computer system that is configured, for example, to control an apparatus, an equipment, a device or an installation. The controller may also be a computer, a computer system or else what is known as a cloud, on which control software or a control software application, for example a control application or control app, is implemented or installed. Such a control application implemented in the cloud may be configured, for example, as an application having the functionality of a programmable logic controller.

The control device may furthermore also be configured as an "edge device", where such an edge device may, for example, comprise an application for controlling devices or installations. By way of example, such an application may be configured as an application having the functionality of a programmable logic controller. The edge device may, in this case, for example, be connected to a further control device of a device or installation or else directly to a device or installation to be controlled. The edge device may furthermore be configured such that it is additionally also connected to a data network or a cloud or is configured to be connected to a corresponding data network or a corresponding cloud.

The control device may, for example, also be configured as a programmable logic controller (PLC). The control device may furthermore also be configured as a modular programmable logic controller (modular PLC).

A programmable logic controller (PLC) is a component that is programmed and used to regulate or to control an installation or machine. Specific functions, such as flow control, may be implemented in a PLC, such that both the input signals and the output signals of processes or machines are thereby able to be controlled. The programmable logic controller is defined, for example, at least in part in the European (EN) standard 61131 or in the International Electrotechnical Commission (IEC) standard 61131.

In order to connect a programmable logic controller to the installation or machine, both actuators that are generally connected to the outputs of the programmable logic controller and sensors are used. Status displays are also used. The sensors are located in principle at the PLC inputs, where the programmable logic controller uses these sensors to obtain information about what is going on in the installation or machine. Sensors include, for example: light corridors, limit switches, buttons, incremental encoders, fill level sensors, temperature sensors and pressure sensors. Actuators include, for example: contactors for switching on electric motors, electric valves for compressed air or hydraulics, drive control modules, motors, drives.

A PLC may be implemented in various ways. That is, it may be implemented as a single electronic device, as a software emulation and/or as a plug-in PC card. Modular solutions in which the PLC is constructed from multiple plug-in modules are often also encountered.

The evaluation device may be any computer device that has enough memory and computing capability to take on the storage, the operation and/or the handling of the corresponding ML model. The evaluation device may in particular, for example, be an appropriate control device, an appropriate controller, a programmable logic controller, a modular programmable logic controller or a comparable device. The evaluation device may furthermore, for example, be configured as an edge device. The evaluation device may furthermore also be computer hardware, a computer or else part of a computing network, for example, an application in a cloud or else in a computer network or a corresponding server or computing device.

An evaluation device may, for example, also be configured as a virtual evaluation device instance that runs or can run, for example, on appropriate hardware, an appropriate computer network or a cloud. Here, the functionality of the evaluation device is generated when the virtual evaluation device instance runs.

By way of example, the evaluation device may also be part of a control device or of a control computer for the tire heating press.

The evaluation device may also be composed of multiple sub-devices. These may, for example, be coupled in terms of communication. Here, each of the sub-devices may then in turn be configured in accordance with the configuration options for an evaluation device that have been explained above.

The evaluation device may furthermore be configured such that the at least one sensor value fed thereto and/or the at least one control variable fed thereto is supplied directly or indirectly to the ML model, in particular supplied to the ML model as an input variable.

The evaluation device may furthermore be configured to process or further process the at least one sensor value and/or the at least one control variable. Such processing or further processing may, for example, be a standardization, conversion, transformation, reformatting, translation and/or any other comparable processing step or comprise same.

The evaluation device may in this case be configured such that, following processing or further processing of the at least one sensor value and/or of the at least one control variable, one or more results of such processing or further processing are fed to the ML model, in particular fed to the ML model as one or more input variables.

The evaluation device may furthermore, for example, comprise a simulation environment that is configured to run a simulation program for simulating the tire heating press, or for simulating parts or components of the tire heating press. The evaluation device may furthermore also comprise a simulation environment with a simulation program for simulating the tire heating press or else for simulating one or more parts or components of the tire heating press.

Simulated parts or components of the tire heating press may, for example, be or comprise device parts that are intended to feed and/or discharge a gas or a liquid to and/or from an elastic bladder. A simulated part of the tire heating press may furthermore also be such an elastic bladder itself or comprise same.

The processing or further processing of the at least one sensor value and/or of the at least one control variable by the evaluation device may in this case be configured as the use of the at least one sensor value or of the at least one control variable as input datum or input data for a simulation program in accordance with the disclosed embodiments running in a simulation environment as described.

A result or results of processing or further processing, formed in this way, of the at least one sensor value and/or of the at least one control variable may then, for example, be one or more values generated in the course of the running of the simulation program, which values may then, for example, be fed on to the ML model (i.e., fed to the ML model as input variable). Such one or more values generated in the course of the running of the simulation program may, for example, be configured as output values from what are known as virtual sensors that are simulated in the course of the simulation (also referred to as "soft sensors"). Examples of such a soft sensor are a virtual pressure sensor, a virtual vapor sensor, a virtual temperature sensor and/or a virtual sensor for measuring a flow of material or energy.

The simulation may in this case for example be designed and configured such that it runs in parallel with a vulcanization process, or parts thereof, running in the tire heating press.

Provision may furthermore be made for the at least one sensor value fed to the evaluation device and/or the at least one control variable fed to the evaluation device to be used as an input variable for a simulation, such as a simulation in accordance with the disclosed embodiments.

Provision may furthermore be made for one or more values generated by a simulation, in particular a simulation in accordance with the disclosed embodiments, to be used as input variable for the ML model. Provision may thus, for example, be made for one or more "soft sensors" to be defined within such a simulation and corresponding soft sensor values to then be calculated and output in the course of the running of the simulation. Provision may in this case furthermore be made for such soft sensor values from one or more such soft sensors to be used as input variables for the ML model. Examples of a soft sensor may be, for example, a virtual pressure sensor, a virtual vapor sensor, a virtual temperature sensor and/or a virtual sensor for measuring a flow of material or energy.

This achieves a further advantageous embodiment, because using such virtual sensors means that a multiplicity of sensors can be generated and used or are used, for example, for the ML model, without having to expand the tire heating press in terms of structure and equipment.

A machine learning method is understood to mean, for example, an automated ("machine") method that generates results not through rules that are fixed in advance, but rather in which patterns are identified from a large number of examples (generally automatically) by way of a machine learning algorithm or learning method, on the basis of which patterns it is then possible to make statements about data to be analyzed.

Such machine learning methods may be configured, for example, as a supervised learning method, a semi-supervised learning method, an unsupervised learning method or a reinforcement learning method.

Examples of machine learning methods are for example regression algorithms (for example, linear regression algorithms), generation or optimization of decision trees, learning methods for neural networks, clustering methods (for example, k-means clustering), learning methods for generating support vector machines (SVM), learning methods for generating sequential decision models or learning methods for generating Bayesian models or networks.

The result of such application of such a machine learning algorithm or learning method to particular data is referred to, in particular in the present disclosure, as machine learning model or ML model. Such an ML model in this case represents the digitally stored or storable result of applying the machine learning algorithm or learning method to the analyzed data.

The generation of the ML model may in this case be configured such that the ML model is retrained by applying the machine learning method or a pre-existing ML model is changed or adapted by applying the machine learning method.

Examples of such ML models are results of regression algorithms (for example, a linear regression algorithm), neural networks, decision trees, the results of clustering methods (including, for example, the obtained clusters or cluster categories, definitions and/or parameters), support vector machines (SVM), sequential decision models or Bayesian models or networks.

Neural networks may in this case, for example, be "deep" neural networks, feedforward neural networks, recurrent neural networks, convolutional neural networks or autoencoder neural networks. The application of corresponding machine learning methods to neural networks is in this case often also referred to as training of the corresponding neural network.

Decision trees may be configured, for example, as what are known as an iterative dichotomizer 3 (ID3), classification and regression trees (CART) or random forests.

A neural network, at least in connection with the present disclosure, is understood to mean an electronic device that comprises a network of nodes, where each node generally is connected to a plurality of other nodes. The nodes are also referred to, for example, as neurons or units. Here, each node has at least one input connection and one output connection. Input nodes for a neural network are understood to mean those nodes that can receive signals from the outside world (data, stimuli, and/or patterns). Output nodes of a neural network are understood to mean those nodes that can forward signals, and/or data to the outside world. What are known as "hidden nodes" are understood to mean those nodes of a neural network that are formed neither as input nodes nor as output nodes.

The neural network may in this case, for example, be formed as a deep neural network (DNN). Such a deep neural network is a neural network in which the network nodes are arranged in layers (the layers themselves being able to be one-dimensional, two-dimensional or otherwise higher-dimensional). A deep neural network in this case comprises at least one or two what are known as hidden layers, which comprise just nodes that are not input nodes or output nodes. That is, the hidden layers do not have any connection to input signals or output signals.

What is known as deep learning is in this case understood to mean, for example, a class of machine learning techniques that utilizes many layers of non-linear information processing for supervised or unsupervised feature extraction and transformation and for pattern analysis and classification. What is known as a deep neural network, for example, in accordance with the present disclosure, is in this case used in the course of such deep learning.

The neural network may also, for example, have what is known as an autoencoder structure, which is explained in even more detail throughout the present disclosure. Such an autoencoder structure may, for example, be suitable for reducing a dimensionality of the data and thus, for example, for recognizing similarities and common features.

A neural network may also be, for example, as what is known as a classification network, which is particularly suitable for dividing data into categories. Such classification networks are used, for example, in connection with handwriting recognition.

A further possible structure of a neural network may, for example, be the refinement in the form of what is known as a deep believe network.

A neural network may also have, for example, a combination of a plurality of the abovementioned structures. The architecture of the neural network may thus, for example, comprise an autoencoder structure in order to reduce the dimensionality of the input data, which may then furthermore be combined with another network structure in order, for example, to recognize features and/or anomalies within the data-reduced dimensionality or to classify the data-reduced dimensionality.

The values describing the individual nodes and their connections, including further values describing a particular neural network, may be stored, for example, in a value set describing the neural network. Such a value set then constitutes a refinement of the neural network, for example. If such a value set is stored following training of the neural network, then a refinement of a trained neural network is thus stored, for example. It is thus possible, for example, to train the neural network with corresponding training data in a first computer system, to then store the corresponding value set that is associated with this neural network and to transfer it, as a refinement of the trained neural network, into a second system, and then to apply the trained neural network there, for example.

A neural network is generally able to be trained by determining parameter values for the individual nodes or for their connections using a wide variety of known learning methods by inputting input data into the neural network and analyzing the then corresponding output data from the neural network. A neural network is thus able to be trained with known data, patterns, stimuli or signals in a manner nowadays known per se, so as then subsequently to be able to use the thus-trained network for the analysis of further data, for example.

Training the neural network is generally understood to mean that the data with which the neural network is trained are processed in the neural network using one or more training algorithms so as to calculate or to change what are known as bias values (bias), weighting values (weights) and/or transfer functions of the individual nodes of the neural network or of the connections between in each case two nodes within the neural network.

One of the what are known as supervised learning methods may be used to train a neural network, such as in accordance with the present disclosure. In this case, through training with corresponding training data, a network is trained on results or capabilities respectively associated with these data. Furthermore, what is known as an unsupervised learning method may also be used to train the neural network. Such an algorithm, for example, generates, for a given number of inputs, a model that describes the inputs and permits predictions therefrom. In this case, there are, for example, clustering methods via which the data can be divided into different categories if they differ from one another, such as through characteristic patterns.

When training a neural network, supervised and unsupervised learning methods may also be combined, for example, if portions of the data are assigned trainable properties or capabilities, whereas this is not the case for another portion of the data.

Furthermore, what are known as reinforcement learning methods may also additionally be used to train the neural network, at least inter alia.

By way of example, training that requires relatively high computational power of a corresponding computer may be performed on a high-performance system, whereas further tasks or data analyses are then still able to be performed on a lower-performance system using the trained neural network. Such further tasks and/or data analyses using the trained neural network may occur, for example, on an assistance system and/or on a control device, a programmable logic controller or a modular programmable logic controller or other corresponding devices in accordance with the present disclosure.

A defect in the context of the present disclosure is understood to mean in particular any defective functionality of an apparatus or a device, here the tire heating press. A defect is in particular considered to be a defective functionality that leads to a defective product design, unusual wear or else to damage to the apparatus or the device or its components.

An anomaly in the context of the present disclosure is understood to mean, for example, that a corresponding apparatus or a corresponding device does not behave as intended. In this case, the anomaly that is present does not necessary lead to defects in a manufactured product, here for example a product produced by the tire heating press, but rather may, for example, be a behavior of the device or the apparatus that was not envisaged when configuring and planning the apparatus or the device. Such anomalies possibly lead to unpredictable behavior of the apparatus or of the device, which may in turn, for example, lead to damage to the apparatus, destruction or even endanger humans and hardware. Consequently, it is helpful, or often even necessary, to recognize such anomalies for safe operation of an apparatus or of a device.

The fact that there will be a defect or an anomaly in the foreseeable future may for example, be configured such that the time period encompassed by "in the foreseeable future" is that time period that is or could be required at least substantially to organize rectification of the causes of the defect or of the anomaly and to ascertain and determine the causes. The time period encompassed by "in the foreseeable future" may furthermore also be that time period that is or could be required to plan appropriate consultancy work for rectifying causes and/or the defect or the anomaly. The time period encompassed by "in the foreseeable future" may furthermore also be a time period until the next scheduled maintenance period or until the next scheduled maintenance interval. The time period encompassed by "in the foreseeable future" may additionally also comprise several of the abovementioned time periods.

The warning notification may, for example, comprise information about a recognized anomaly and recognized possible defects and/or problems, or information about possibly upcoming anomalies, defects and/or problems. The warning notification may furthermore also comprise information about possible causes of the recognized defect and/or the recognized anomaly and possibilities for ascertaining such causes. Such a warning notification may furthermore also comprise information about a person responsible for appropriate maintenance or rectifying causes of possible defects, an appropriate group of people or an appropriate service facility having appropriate contact data, such as addresses, telephone numbers, and/or email addresses.

The fact that the evaluation device or the evaluation device using the ML model outputs a warning notification when the evaluation of the at least one sensor value and/or the at least one control variable reveals the presence of a defect or an anomaly, or that there will be a defect or an anomaly in the foreseeable future, may be configured as explained below.

In the case of the refinement of the ML model as a neural network, provision may, for example, be made, following the input of the at least one sensor value and/or the at least one control variable into the neural network, for example, for corresponding information to be output by the neural network, displaying, possibly after further evaluation steps performed by the evaluation device, the output of a corresponding warning notification.

The neural network may in this case, for example, have been trained with corresponding sensor values and/or control variables and known states of the tire heating press and/or of a bladder of the tire heating press using a supervised learning method. This is explained in even more detail in the description below. In this case, the evaluation device may be configured such that the neural network outputs information, for example, via a corresponding output node layer of the neural network, displaying the outputting of a corresponding warning notification.

The neural network may furthermore also have been trained with corresponding sensor values and/or control variables using unsupervised learning methods. This is also explained in even more detail below. If in such a case, for example, a neural network having what is known as an autoencoder structure is used, as explained in even more detail in the further description, then provision may, for example, be made for the output of a corresponding warning notification to be displayed based on changes in what is known as a code node layer of the autoencoder (explained in even more detail in the following text).

When using further refinements for the ML model, as explained in even more detail in the following text, the sequence for displaying the outputting of a warning notification using the ML model may be implemented in a comparable manner.

In one advantageous embodiment, the tire heating press may comprise an elastic bladder that is configured to support a vulcanization process of a vehicle tire located in the tire heating press.

The tire heating press with the bladder may in this case be configured such that it supports a vulcanization process of a vehicle tire located in the tire heating press using a gas fed or can be fed to the bladder or a liquid fed or able to be fed to the bladder.

Provision may furthermore be made, in order to support the vulcanization process of a vehicle tire located in the tire heating press, for a hot or heated gas or a hot or heated liquid to be able to be fed or to be fed to the bladder.

The bladder (also referred to, for example, as tire curing bladder) is configured as an elastic bladder (for example, made of rubber or a comparable material) that can be inflated or expanded by being fed with a gas or a liquid, and can be deflated by gas contained therein or liquid contained therein being discharged and/or aspirated. The bladder may in this case, for example, be configured such that it can be expanded or expands when it is filled with a gas or a liquid, and accordingly contracts or can be contracted when it is drained again.

The bladder may, for example, in this case furthermore be configured such that the gas that can be fed or is fed or the liquid that is fed or can be fed may, for example, have temperatures of up to 150 degrees Celsius, advantageously of up to 200 degrees Celsius and more advantageously of up to 250 degrees Celsius.

The bladder may furthermore be configured such that, for example, air, steam, hydrogen and/or other gases, inter alia, including having the abovementioned temperatures, can be fed as gases. For example, water is often used as liquid.

The bladder may in this case be configured such that it can, at least when it is located inside a green tire, withstand a pressure of up to 30 bar or more, or a negative pressure of down to −1 bar.

The monitoring of the bladder plays an important role in the course of monitoring a vulcanization process in a tire heating press. For instance, tears and/or leaks in the material of the bladder may, for example, lead to hot gas or hot liquid entering into the interspace between the bladder and the green tire and leading to the vehicle tire that is produced then becoming faulty and/or having a reduced quality. If such a tear or defect is recognized too late in the bladder, for example, this may also lead to a relatively large number of vehicle tires of reduced quality or even unusable vehicle tires being produced in the tire heating press.

It is therefore advantageous to recognize such damage in a bladder early or, better still, to identify that such damage could occur in the near future even before the actual defect occurs. This may be achieved, for example, by already recognizing for example corresponding precursors to such a defect, such as corresponding microtears.

The evaluation device and/or the ML model may furthermore be configured such that a warning notification is output when an evaluation of the at least one sensor value or of the at least one control variable by the evaluation device reveals (i) that there is an anomaly or a defect with the bladder, or (ii) that there will be an anomaly or a defect with the bladder in the foreseeable future The evaluation of the at least one sensor value or of the at least one control variable may in this case be performed by the evaluation device advantageously using the ML model.

In this advantageous embodiment, the method is configured, for example, such that a warning notification is output when an evaluation of the at least one sensor value or of the at least control variable by the evaluation device using the ML model reveals that the bladder is defective or that there will be a defect with the bladder in the foreseeable future.

The disclosed embodiments of the invention are therefore also achieved by a method for monitoring a vulcanization process of a vehicle tire in a tire heating press with an elastic bladder, where the elastic bladder is configured to support a vulcanization process of a vehicle tire located in the tire heating press. During this method, at least one sensor value and/or at least one control variable of the tire heating press is acquired, where the at least one sensor value and/or the at least one control variable is fed to an evaluation device for evaluation, where the evaluation device comprises an ML model configured by way of a machine learning method, and where the evaluation device and/or the ML model outputs a warning notification when an evaluation of the at least one sensor value or of the at least one control variable by the evaluation device using the ML model reveals that (i) there is an anomaly or a defect with the bladder, or (ii) that there will be an anomaly or a defect with the bladder in the foreseeable future.

The bladder is one of the wearable parts of a tire heating press and is therefore impacted relatively regularly by corresponding anomalies and defects. Accordingly, the present embodiment makes it possible to particularly efficiently configure process control or installation monitoring for a tire heating press. Correct functioning of the bladder is furthermore important for the quality of the vehicle tire that is produced and also for corresponding resource-saving operation of the tire heating press.

A defect or an anomaly with the bladder, or an impending defect or an impending anomaly with the bladder, may be expressed in a wide variety of parameters or temporal parameter profiles of the tire heating press, where each of the corresponding parameters may potentially also behave abnormally for other reasons as well.

It is therefore often possible to conclude as to an impending anomaly or an impending defect with the bladder only from a particular combination of particular parameters or particular changes of parameters of the tire heating press.

Such relationships are often relatively complex and difficult to detect analytically. As a result, the effort to recognize such defects and anomalies, or impending defects and anomalies, may advantageously be reduced here by using an ML model.

The disclosed embodiment of the method may in this case be configured such that all sensor values of the at least one sensor value are delivered by sensors of the tire heating press that are also required and/or used for an intended vulcanization process of a vehicle tire in the tire heating press.

One advantage of the instant embodiment is that no separate measures in terms of equipment need to be taken within the framework of the sensor system for the operation of the evaluation device or the recognition as to whether there is a defect or anomaly or there will be one in the foreseeable future, but rather use is made only of sensors that are provided anyway for corresponding production of vehicle tires of an intended quality.

This technique makes it possible to further reduce outlay in terms of equipment and/or construction for performing system monitoring or process control for the tire heating press.

A sensor is required, for example, for an intended vulcanization process when it is required during the vulcanization process in order to produce tires of a predefined quality. Such "required" sensors are provided not only, for example, for predictive maintenance or identifying installation defects or wear to the installation, or components thereof. "Required" sensors may furthermore also be those that are provided not only for use with an evaluation device according to the present description.

Sensors are used, for example, for an intended vulcanization process when they are used in the course of the sequence of a vulcanization process of a vehicle tire in order to produce tires of a predefined or predefinable quality. Such "used" sensors are provided not only, for example, for predictive maintenance or identifying installation defects or wear to the installation or components thereof. "Used" sensors may furthermore also be those that are provided not only for use with an evaluation device in accordance with the present disclosure.

The fact that the sensors are required or are used for an intended vulcanization process of a vehicle tire in the tire heating press may, for example, mean that the corresponding sensors would also be present if no evaluation device in accordance with the disclosed embodiments of the invention (or a device comparable to the evaluation device) were to be provided in the tire heating press.

The fact that the sensors are required or are used for an intended vulcanization process of a vehicle tire in the tire heating press may, for example, also mean that the corresponding sensors would also be present if the tire heating press were to be configured only to vulcanize vehicle tires and not also to implement or to assist methods for installation monitoring, for predictive maintenance, for quality control and/or also to operate or to support an evaluation device in accordance with the present disclosure.

A method in accordance with the disclosure may furthermore be configured such that the tire heating press comprises a control device for controlling the vulcanization process, and that at least one of the at least one control variable comprises an actuation variable, output by the control device in the course of the vulcanization process, for the tire heating press or a component of the tire heating press.

Using a corresponding actuation variable for the tire heating press during a method in accordance with the disclosure makes it possible to reduce the outlay in terms of operation or construction for performing installation monitoring or process control, because such actuation variables alone are required for the operation of the corresponding tire heating press.

The actuation variable for the tire heating press may in this case be any electrical or electronic control variable transmitted by a controller or a control system to the tire heating press or a component thereof. The actuation variable may in particular be any electrical or electronic control variable that is transmitted by a controller or a control system to the tire heating press or a component thereof in the course of a vulcanization process of a vehicle tire within the tire heating press. The actuation variable may in this case be transmitted in particular, for example, to an actuator of the tire heating press.

An electrical control variable may be for example an analog signal, for example, a corresponding pulse, a voltage level, a signal with a particular frequency or a modulated signal with a particular frequency or a comparable signal. An electronic control variable may be any type of digital information, for example one or more digital variables or a digital message.

The method, respectively a tire heating press in accordance with disclosed embodiments, may furthermore be configured such that the tire heating press comprises a pressure sensor and that at least one of the at least one sensor value is delivered by the pressure sensor, and/or that the tire heating press comprises a temperature sensor, and that at least one of the at least one sensor value is delivered by the temperature sensor.

Temperature sensors may in this case be any type of sensors that measure a temperature within the tire heating press or of one or more components of the tire heating press and, for example, transmit it to a control device of the tire heating press and/or to the evaluation device. A temperature of a component of the tire heating press or else of a process gas or of a process liquid or of another process substance may in this case be measured, for example. A temperature of the vehicle tire that is to be vulcanized or that is vulcanized or of the vehicle tire during the vulcanization process may also be measured, for example.

Pressure sensors may in this case be any type of sensors that measure a pressure within the tire heating press or inside one or more components of the tire heating press and, for example, transmit it to a control device of the tire heating press and/or to the evaluation device. The pressure of a process gas or of a process liquid or of another process substance may in this case be measured, for example. By way of example, the pressure sensor may be used to measure the pressure within a feed or exhaust line of the tire heating press, for example, a feed or exhaust line for process substances used in the course of a vulcanization process. In one preferred embodiment, the pressure sensor may also be used, for example, to measure the pressure in a bladder of the tire heating press.

A method in accordance with the presently disclosed embodiments and/or a tire heating press in accordance with the presently disclosed embodiments may furthermore be configured such that the tire heating press comprises at least one feed valve for regulating the feed of a gas or of a liquid to the bladder and at least one discharge valve for regulating the transportation of the gas or of the liquid out of the bladder, and that at least one of the at least one sensor value is delivered by a position sensor of the at least one feed valve and/or is delivered by a position sensor of the at least one discharge valve, and/or that at least one of the at least one control variable comprises an actuation variable for the at least one feed valve and/or an actuation variable for the at least one discharge valve.

The feed valve and/or the discharge valve may in this case, for example, have two states (in particular exactly two states) a blocking state in which a flow of a process substance is prevented by the valve, and a flow state in which the process substance is allowed through by the valve. The feed and/or discharge valve may furthermore also be configured such that it can continuously adjust a flow of corresponding process substances.

Each of the valves may, for example, have a position sensor, on the basis of the signal from which the open or flow state of the valve can be determined, for example. Such a position sensor may be implemented, for example, in a wide variety of ways, such as by the sensor recording the position of a closure mechanism in the valve, by the sensor recording a flow through the valve, by the sensor detecting an adjustment signal for a motorized closing mechanism or through comparable mechanisms.

The actuation variable for the at least one feed valve or the at least one discharge valve may, for example, be transmitted by a control device of the tire heating press to one of said valves in order to adjust the corresponding valve state. This may be configured, for example, as an analog and/or digital signal, as are typically used, for example, for such control.

In order to fill the bladder with corresponding process substances, provision may be made in the tire heating press, for example, for an on/off valve for a hot gas (for example, between 110 and 180 degrees Celsius) under a relatively low pressure (for example, between 2 and 8 bar) and a further on/off valve for the feed of hot gas (for example, 190 to 230 degrees Celsius) under a relatively high pressure (17 to 30 bar). Provision may then, for example, furthermore be made, in the gas feed line for the bladder, in addition to said on/off valves, for one or more further control valves, via which the fed flow of gas or the pressure of the fed flow of gas can be adjusted.

Process substances located in the elastic bladder may, for example, be discharged via an overpressure prevailing in the bladder and/or else through aspiration, such as via a pump.

The method in accordance with the presently disclosed embodiments and/or a tire heating press in accordance with the presently disclosed embodiments may additionally also be configured such that at least one of the at least one sensor value is delivered by a bladder pressure sensor that is configured to measure an internal pressure in the bladder, and/or that at least one of the at least one sensor value is delivered by a feed pressure sensor that is configured to measure a pressure in a feed line for the bladder, and/or that at least one of the at least one sensor value is delivered by a discharge pressure sensor that is configured to measure a pressure in a discharge line for the bladder.

Such pressure sensors may be any pressure sensors suitable for such pressure measurements and the corresponding operating conditions in a tire heating press.

Such pressure sensors may in this case be any type of pressure sensors that are able to be used or can be used for the temperature and pressure conditions present in a corresponding tire heating press. In the context of such a device, it is possible to use, for example, a hot gas or a hot liquid (for example, between 110 and 180 degrees Celsius or between 190 and 230 degrees Celsius) under a relatively low pressure (for example, between 2 and 8 bar) or under a relatively high pressure (from 17 to 30 bar). It is therefore possible, for example, to use pressure sensors that are suitable, for example, for temperatures of up to 250° C. and a pressure of up to 30 bar.

The pressure sensors may in this case be provided at various positions in the media supply to the bladder or even in the bladder itself.

In one preferred embodiment, provision may be made, for example, for one pressure sensor each in a feed line, a discharge line and in the bladder itself. It is thereby possible, for example, to capture a good image of the states during filling and discharging of the bladder and in the operating state, which may enable advantageous determination of possible problems with the device, the media supply and/or the bladder.

A method in accordance with the presently disclosed embodiments and/or a tire heating press in accordance with the presently disclosed embodiments may furthermore be configured such that at least one of the at least one sensor value is delivered by a bladder temperature sensor that is designed and configured to measure a temperature in the bladder, and/or that at least one of the at least one sensor value is delivered by a feed temperature sensor that is configured to measure a temperature in a feed line for the bladder, and/or that at least one of the at least one sensor value is delivered by a discharge temperature sensor that is configured to measure a temperature in a discharge line for the bladder.

In the same way, provision may also be made for respective temperature sensors that may likewise be suitable and intended for the abovementioned pressure and/or temperature conditions in the tire heating press.

The temperature sensors may also, in one advantageous embodiment, be provided, for example, in a feed line, a discharge line and in the bladder of the tire heating press in order to be able to obtain the most comprehensive image possible of the states and processes in the course of a vulcanization process for a vehicle tire.

Provision may furthermore be made for the ML model to be configured as a neural network that has been trained at least inter alia with sensor values and/or control variables in accordance with the present disclosure.

The ML model, the neural network and/or the training of the neural network may in this case be configured in accordance with the present disclosure, for example.

The training of the neural network may in particular be configured as what is known as supervised learning, for example. What is known as a deep neural network may be used here, for example. A deep-learning learning method may be used as learning method, for example. In this case, training data for training the neural network may, for example, be configured such that acquired one or more sensor values from one or more sensors and/or one or more control variables are assigned to a state or a characteristic variable of the tire heating press. These acquired one or more sensor values and/or one or more control variables may, for example, be acquired at a particular time or have been acquired in a particular predefined or predefinable time period. This assignment of a state or of a characteristic variable to particular one or more sensor values is often referred to as "labeling" of the sensor data or control variables with the data. One or more sensor data and/or one or more control variables, including a characteristic variable, a quality characteristic variable or a description variable of the vehicle tire located right in the tire heating press at this time may furthermore also be assigned to a characteristic variable or a state of the bladder.

The supervised learning may furthermore also be configured, for example, such that training data are formed in a manner such that, for example, a time series of sensor values from a particular sensor and/or a time series of values of a particular control variable are assigned, for example, one or more of the abovementioned characteristic variables or data. In a comparable manner, time series of sensor values that originate from different sensors and/or time series of values of different control variables may also be assigned to one or more of the abovementioned characteristic variables.

In the case in which the evaluation device comprises a simulation environment that is configured to run a simulation program for simulating the tire heating press, or parts or components of the tire heating press, at least inter alia sensor values from one or more soft sensors or virtual sensors, for example, in accordance with the presently disclosed embodiments, simulated during the running of the simulation program, may also be used to train a neural network in accordance with the present disclosure.

In the case as well in which the evaluation device comprises a simulation environment having a simulation program for simulating the tire heating press, or parts or components of the tire heating press, at least inter alia sensor values from one or more soft sensors or virtual sensors, for example in accordance with the presently disclosed embodiments, simulated in the course of the running of the simulation program, may also be used to train a neural network according to the present description.

In this case, such use of soft sensor or virtual sensor values occurs in each case in the same way as the use of values from real sensors of the tire heating press to train a neural network in accordance with the present disclosure.

By virtue of training a corresponding neural network with one or more of the abovementioned training data, the neural network may then be configured such that it is possible to derive a state of the tire heating press, of components thereof (for example, the bladder), or of a vehicle tire currently located in the tire heating press based on captured data from one or more of the sensors of the tire heating press. This may, for example, be configured such that the corresponding sensor values are used as input values for the neural network thus trained, and said characteristic variables then represent output values of the neural network or are accordingly derived from such output values.

In one alternative embodiment, a neural network with an "autoencoder structure", for example, may also be trained with such sensor and/or control variables using an unsupervised learning method. Using this trained autoencoder, various states with regard to the tire heating press or the production process and/or else the processed vehicle tire may then for example be identified. Based on evaluation of these identified states, it is then also possible to identify for example states associated with fault cases. States associated with incipient fault cases or problems may thus also be recognized.

This makes it possible, for example, to reduce outlay in terms of equipment and/or construction for performing installation monitoring and/or process control for the tire heating press, because the method may, for example, be configured such that, in the course of the abovementioned method, only sensors that are present anyway in the tire heating press are used, for example, in order to allow an orderly flow of the vulcanization process, for example.

In one advantageous embodiment, the neural network comprises an autoencoder structure that has been trained at least inter alia with sensor values and/or control variables in accordance with the presently disclosed embodiments using an unsupervised learning method.

The neural network may furthermore have a deep learning architecture and have been trained at least inter alia with sensor values and/or control variables in accordance with the presently disclosed embodiments using a supervised learning method The ML model may be configured, for example, as a support vector machine, a gradient boosted tree model or a random forest model, each of which have been configured at least inter alia using sensor values and/or control variables in accordance with the presently disclosed embodiments.

The ML model, the support vector machine, the gradient boosted tree model and/or the random forest model may in this case be configured in accordance with the presently disclosed embodiments, for example. The configuration of the ML models, like the preparation of the data as training data for configuring the ML models, may in this case, for example, also be designed in accordance with the presently disclosed embodiments. The configuration of such ML models may in this case, for example, configured using conventional methods and techniques for this purpose.

It is also an object of the invention to provide an evaluation device for monitoring a vulcanization process of a vehicle tire in a tire heating press, where the tire heating press is configured to acquire at least one sensor value and/or at least one control variable of the tire heating press.

Provision is furthermore made in this case for the evaluation device to comprise an ML model configured via a machine learning method, for the evaluation device to be configured to receive the at least one sensor value and/or the at least one control variable, and for the evaluation device and/or the ML model to furthermore be configured such that a warning notification is output when an evaluation of the at least one sensor value and/or of the at least one control variable by the evaluation device using the ML model reveals (i) that there is a defect or an anomaly with the tire heating press or at least part of the tire heating press, or (ii) that there will be a defect or an anomaly with the tire heating press or at least part of the tire heating press in the foreseeable future.

By way of example, the evaluation device, the tire heating press, the vulcanization process of a vehicle tire, the sensor value, the control variable, the machine learning method, the ML model, the warning notification, the defect, the anomaly or the presence of a defect or of an anomaly in the foreseeable future may in this case, for example, be configured in accordance with the presently disclosed embodiments.

As already explained in the course of the present disclosure, when using an evaluation device in accordance with the presently disclosed embodiments, outlay in terms of equipment and/or construction for performing installation monitoring and/or process control for a tire heating press may be reduced.

The tire heating press may, for example, comprise an elastic bladder that is designed configured to support a vulcanization process of a vehicle tire located in the tire heating press. Here, the elastic bladder may, for example, be configured in accordance with the presently disclosed embodiments description.

The evaluation device may, for example, be configured to perform a method kin accordance with the presently disclosed embodiments.

It is also an object of the invention to provide a tire heating press for vulcanizing vehicle tires, where the tire heating press particularly comprises an elastic bladder that is configured to support a vulcanization process of a vehicle tire located in the tire heating press, where the tire heating press is configured to acquire at least one sensor value and/or at least one control variable of the tire heating press, and where the tire heating press furthermore comprises an evaluation device in accordance with the presently disclosed embodiments.

The tire heating press, the elastic bladder, the vehicle tire, the at least one sensor value, the at least one control variable and the evaluation device may in this case, for example, be configured in accordance with the presently disclosed embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below by way of example with reference to the accompanying figures, in which.

DETAILED DESCRIPTION OF THE EXEMPLARY EMBODIMENTS

Figure 1:
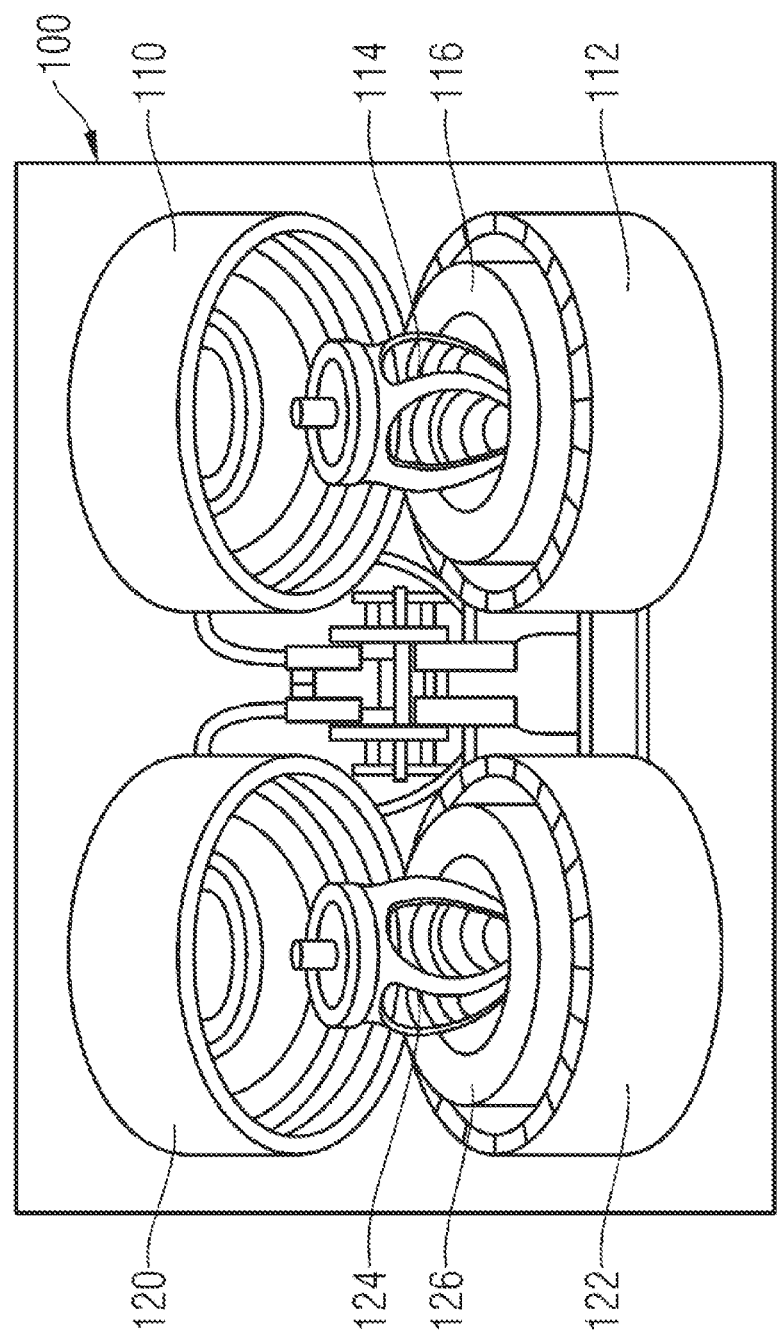
FIG. 1 is schematic illustration of exemplary a tire heating press in accordance with the invention.

FIG. 1 shows one exemplary embodiment of a tire heating press 100 in accordance with the present disclosure. Here, only some of the essential parts of such a tire heating press 100 are shown in FIG. 1 for purposes of simplicity and clarity. Reference may be made to the associated specialist literature for further details on such tire heating presses 100.

The tire heating press 100 comprises two identical vulcanization stations for parallel vulcanization of a first green tire 116 and a second green tire 126. To vulcanize the green tires 116, 126, the tire heating press 100 comprises two lower tire molds 112, 122 and two upper tire molds 110, 120, which surround the respective green tire 116, 126 during the vulcanization process. FIG. 1 illustrates the upper tire molds 110, 120 and the lower tire molds 112, 122 in an open state that is used to load the green tires 116, 126. During the vulcanization process of the green tires 116, 126, the upper tire molds 110, 120 each lie on the lower tire molds 112, 122 and thus form a closed state.

To assist the vulcanization of the green tires 116, 126, the tire heating press 100 comprises two bladders 114, 124, which are illustrated in a de-aerated or deflated state in FIG. 1. In the course of the vulcanization process of the green tires 116, 126, the bladders 114, 124 are filled with hot vapor under a high pressure, expand within the respective green tires 116, 126 and thereby press them against the lower tire molds 112, 122 and the upper tire molds 110, 120. In addition to the actual vulcanization of the tire material, for example, a tire profile and also other relief-type structures of the vehicle tire 116, 126 are thereby also impressed into the green tire 116, 126.

The hot vapor mentioned here for filling the bladder 114, 124 is just one example of the wide variety of gases or liquids able to be used in such tire heating presses 100. During the vulcanization process, these may, for example, have temperatures of up to 100 degrees Celsius, advantageously of up to 200 degrees Celsius and more advantageously up to 250 or 300 degrees Celsius.

The bladder and the corresponding media system may furthermore be configured such that air, steam, hydrogen and/or other gases, inter alia, including having the abovementioned temperatures, can be used as gases. If, for example, a liquid is to be used instead, then water is often used.

The bladder 114, 124 may in this case be configured such that it can, at least inside a green tire, withstand a pressure of up to 30 bar or more, or a negative pressure of down to −1 bar. The corresponding media system may then also be established for these pressure ranges.

Figure 2:
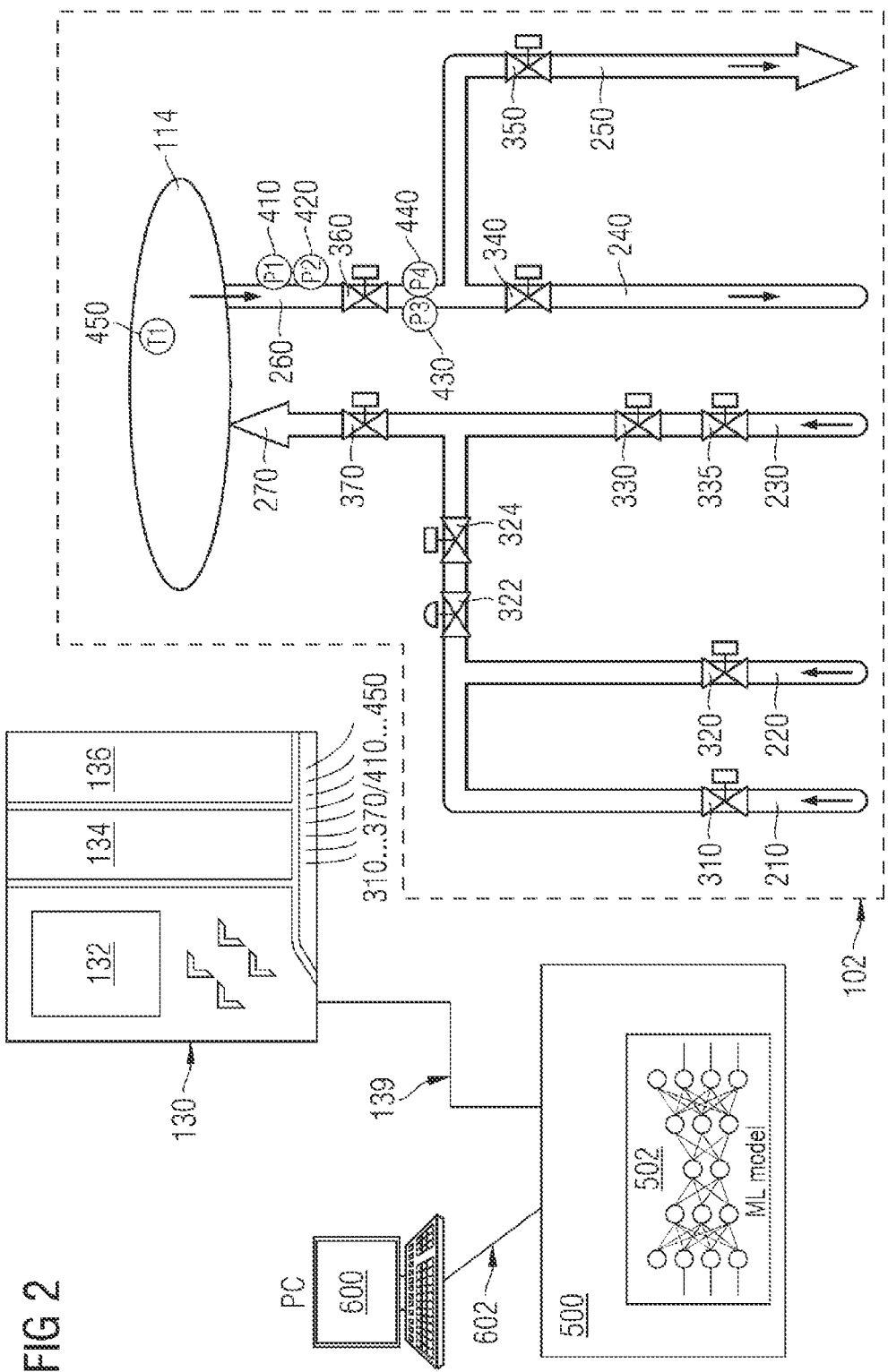
FIG. 2 is a schematic illustration of a vapor system for a tire heating press having an associated control and evaluation device in accordance with the invention.

FIG. 2 shows a steam media system 102 with the bladder 114 from the right-hand part of the tire heating press 100 illustrated in FIG. 1. Here, a temperature sensor 450 is installed in the region of the bladder 114 and may be used to ascertain the temperature of the bladder 114 and/or inside the bladder 114. A first pressure sensor 410, which is established to measure a pressure of between 0 and 4 bar, is located at the output region of the bladder, on the right-hand side of the media system 102. Also located there is a second pressure sensor 420, which is set to measure a pressure of between −1 and 32 bar. Using the two pressure sensors 410, 420 and the temperature sensor 450, it is possible to determine the state of the steam in the bladder 114 with good level of accuracy in the various pressure and temperature ranges.

The right-hand region of the steam media system 102 is configured for the inflow of steam. On the far left there is located an inflow channel 210 for the inflow of steam at a relatively low pressure of between 2 and 8 bar and temperatures of 110 to 180° C. In order to regulate the inflow in this first inflow line 210, an on/off valve 310 in this inflow line 210 is provided.

Next to this first inflow line 210 on the right in FIG. 2, provision is made for a second inflow line 220 for the inflow of steam at a high pressure of between 17 and 30 bar and with a temperature of between 190 and 230° C. This second inflow line 220 again contains an on/off valve 320 for switching this flow of steam on and off. After these two inflow lines 210, 220 have combined, provision is made, in the combined inflow line, for a control valve 322 use of which permit the respective flow of steam to be controlled more accurately. A safety valve 321 is arranged downstream in the inflow line.

Next to the high-pressure feed line 220 on the right in FIG. 2 there is arranged a further feed line 230 that is provided for the inflow of further process gases or liquids. This third inflow line 230 also contains an on/off valve 335 for activating and deactivating a corresponding flow of gas or liquid through this third feed line 230.

All three feed lines 210, 220, 230 then run together in a single bladder feed 270, in which a main inlet valve 370 is provided.

Provision is made, on the outlet side of the bladder, for a main outlet line 260 for discharging liquids or gases contained in the bladder 114. This outlet line 260 also contains the abovementioned pressure sensors 410, 420. A main outlet valve 360 for controlling the media outlets from the bladder 114 is arranged downstream of these pressure sensors in the outlet direction. Arranged downstream of the outlet valve 360 in the outlet line 260, in turn, is a third pressure sensor 430 for detecting media in a pressure range between zero and four bar and a fourth pressure sensor 440 for measuring the pressure of media in a pressure range between minus one and 32 bar. Arranged downstream of the main outlet line 260 is a further outlet line 240 having an on/off valve 340.

Provision is made, downstream of the main outlet line 260 and branching off from the outlet line 240, for a negative pressure line 250 having an on/off valve 350, via which negative pressure line, for example gases or liquids contained in the bladder 114, can be actively aspirated. The aspiration line 450 or a pump installed downstream thereof (not illustrated in FIG. 2) may in this case be provided, for example, in order to establish a vacuum in the region of −0.5 to −0.1 bar and a maximum media temperature of 60° C.

The valves 310, 320, 322, 324, 330, 335, 370, 340, 350, 360 and sensors 410, 420, 430, 440, 450 illustrated in FIG. 2 and/or explained above are examples of components of the tire heating press 100 that are required or are used for an intended vulcanization process of a vehicle tire 116, 126 in the tire heating press 100. The sensors 410, 420, 430, 440, 450 illustrated in FIG. 2 and valves 310, 320, 322, 324, 330, 335, 370, 340, 350, 360 illustrated in FIG. 2, and any sensors that are present (for example, for acquiring a position or a state of the respective valve 310, 320, 322, 324, 330, 335, 370, 340, 350, 360) are examples of sensors 410, 420, 430, 440, 450 of the tire heating press 100 that are required or are used for an intended vulcanization process of a vehicle tire 116, 126 in the tire heating press 100.

FIG. 2 furthermore illustrates a control device 130 that is configured as a modular control device 130 having a central module 132 and a first input/output module 134 and a second input/output module 136. Here, corresponding signal output lines extend from the input/output modules 134, 136 to the various valves 310, 320, 322, 321, 330, 335, 370, 360, 340, 350 of the media system 102. Control signals can be transmitted via these signal output lines from the central module 132 of the control device 130 to the abovementioned valves 310, 320, 322, 321, 330, 335, 370, 360, 340, 350, in order thereby to adjust corresponding valve positions.

Corresponding signal input lines also extend from the temperature sensor 450 and the pressure sensors 410, 420, 430, 440 to the input/output modules 134, 136 in order to transmit the corresponding sensor values to the central module 132 of the control device 130.

This is symbolized in FIG. 2 by citing the reference signs of the corresponding valves and sensors underneath the input and output lines, which are illustrated symbolically underneath the controller 130.

An execution environment for a corresponding control program for controlling the tire heating press 100 is provided in the central module 132. To vulcanize a green tire 116 introduced in the right-hand part of the tire heating press 100, a gas inflow and gas outflow for the correct supporting of the vulcanization process may then, for example, be controlled, in the course of the running of this control program, via the incoming sensor signals and the outgoing actuation signals for corresponding valves 310, 320, 322, 324, 330, 335, 370, 360, 340, 350. The vulcanization process of the green tire 116 is thereby correspondingly supported by a corresponding inflow and outflow of steam into and out of the bladder 114.

Also illustrated in FIG. 2 is an edge device 500, which represents one example of an evaluation device in accordance with the present invention. The edge device 500 in this case contains a neural network 502. The neural network 502 is in this case one exemplary embodiment of an ML model in accordance with the present invention.

This edge device 500 is connected to the control device 130 via a field bus line 139. Control commands that are used to control the tire heating press 100 may, for example, be transmitted to the evaluation device via this field bus line. Position information for the valves 310, 320, 322, 324, 330, 335, 370, 360, 340, 350 of the media system 102 may furthermore be transmitted to the edge device 500 via the field bus line 139. Measured values from the temperature sensor 450 and from the pressure sensors 410, 420, 430, 440 may additionally also be transmitted from the control device to the edge device via this field bus line.

The neural network 502 has been trained with a multiplicity of valve position values and temperature and pressure sensor values such that the respective position and sensor values have each been respectively assigned the fact whether the bladder functioned correctly at these sensor values, or respectively acquired sensor value combinations, whether the bladder was defective at the corresponding sensor values or sensor value combinations (and, for example, had a leak) or whether a defect with the bladder 114, 124 occurred in the foreseeable future at these sensor values or sensor value combinations. Such a time period may, for example, be that 10 vehicle tires, 50 vehicle tires or else 100 vehicle tires were produced in this time period, for example.

In the course of controlling the media system 102 with the control device 130, position values of the valves 310, 320, 322, 324, 330, 335, 370, 360, 340, 350 of the media system 102 and of the sensors 410, 420, 430, 440, 450 of the media system 102 are then transmitted regularly to the edge device 500 during the production of vehicle tires and entered there as input variables into the trained neural network 502. If, in the case of corresponding input data, the neural network outputs the information that the bladder 114 is fine, then the production continues without any further notification.

If the neural network 502, following the input of corresponding data, such as that explained above, outputs the information that a defect with the bladder 114 could occur in the foreseeable future, then a corresponding warning notification is output to a user. This warning notification may, for example, be transmitted to a PC 600 via a data line 602 and output to the user via this PC 600. This warning notification may, for example, comprise the information that a defect with the bladder 114, 124 could be expected in the foreseeable future, where the foreseeable future may be specified in even more detail in the message.

If the neural network 502, following the input of corresponding data, such as that explained above, outputs information that there is already a defect with the bladder 114, then a corresponding warning notification is, for example, output to a user via the PC 600. Provision may furthermore be made in this case for a corresponding message to also be transmitted to the control device 130 from the edge device 500 via the field bus 139 and for a warning signal likewise to be output to the tire heating press 100 thereby. This may be configured, for example, as a red warning light and/or a corresponding acoustic signal. Provision may furthermore be made in this case for corresponding parameters for controlling the media feed and discharge to be changed such that high-quality or at least tolerable vehicle tires are still produced or can be produced at least for a particular time period using a defective bladder 114, 124.

Figure 3:
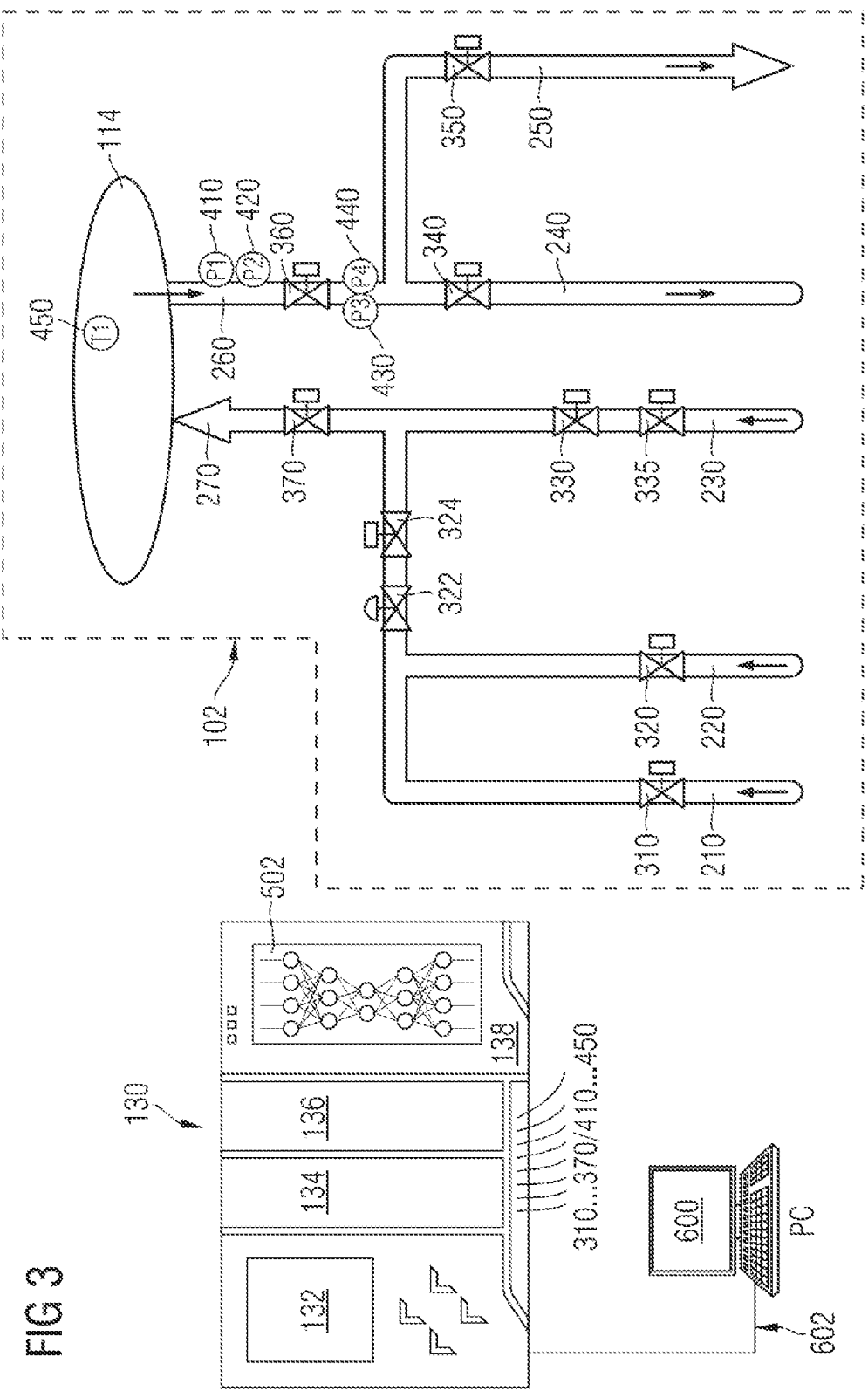
FIG. 3 shows an illustration of the vapor system of FIG. 2 having an alternative embodiment the associated control and evaluation device.

FIG. 3 illustrates a further optional embodiment for the system illustrated in FIG. 2. FIG. 3 in this case illustrates the media system 102 already illustrated in FIG. 2 with the bladder 114. Also illustrated is the control device 130 with the central module 132 and the input and output modules 134, 136, which are configured, in the manner already explained in connection with FIG. 2, with the valves 310, 320, 322, 324, 330, 335, 370, 360, 340, 350 and sensors 410, 420, 430, 440, 450 of the media system 102 to control the feed and discharge of hot steam to and from the bladder 114. The control device 130 illustrated in FIG. 3 furthermore comprises an ML module 138, which comprises the neural network 502 that was provided in the edge device 500 in the exemplary embodiment illustrated in FIG. 2.

In the system illustrated in FIG. 3, the neural network 502 is incorporated directly via a backplane bus of the control device 130 (not illustrated in FIG. 3), via which corresponding valve position values and sensor values are transmitted from the central module 132 of the control device 130 to the neural network 502 in the ML module 138. The corresponding information output by the neural network 502 is then in turn transmitted, via the backplane bus, to the central module 132 of the control device 130, and potentially from the, for example, when a warning notification has been generated, to the PC 600 via the data line 602. A corresponding user may then, as already explained in connection with FIG. 2, receive corresponding warnings about the state of the bladder 114, 124 via the PC 600. The training of the neural network 502 and the input and output signals of the control device 300 in the course of the operation of the tire heating press 100 correspond to those explained in connection with FIG. 2.

Figure 4:
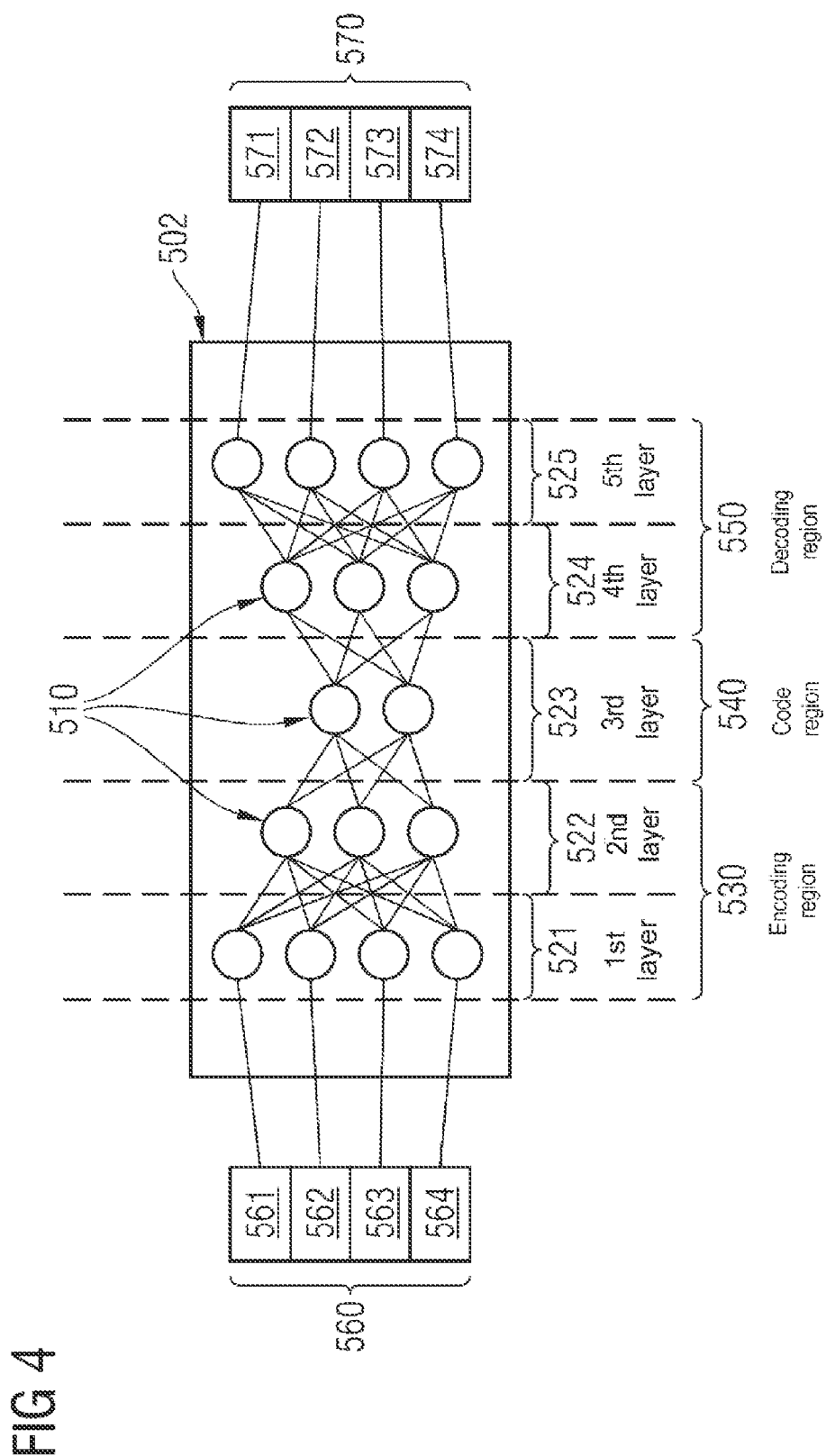
FIG. 4 shows an exemplary embodiment of an ML model formed as a neural network with an autoencoder structure.

FIG. 4 shows an exemplary embodiment of the neural network 502 illustrated in FIGS. 2 and 3. The neural network 502 illustrated in FIG. 4 in this case has what is known as an autoencoder structure and is hereinafter also called autoencoder 502. To simplify the illustration of the structure of the autoencoder 502, comparatively few nodes are depicted, and a two-dimensional neural network 502 has been chosen as an example for illustrative purposes.

Such a neural network 502 with an autoencoder structure represents one example of an ML model in accordance with the disclosed embodiments of the invention and may, for example, be trained or have been trained using training data in accordance with the disclosed embodiments of the invention using unsupervised learning methods, for example, known to a person skilled in the art and accordance with the disclosed embodiments.

The autoencoder 502 has what are known as nodes 510, which are structured in five node layers 521, 522, 523, 524, 525 in the illustrated example. These node layers 521 to 525 are illustrated as superimposed nodes 510 in FIG. 4. Only some of the nodes 510 are identified using a reference sign in FIG. 4, so as to simplify and clarify the illustration. On the left-hand side in FIG. 4 is illustrated an input data vector 560 (a vector is a one-dimensional matrix) having four data fields 561, 562, 563, 564, where in each case one of the input fields 561, 562, 563, 564 is connected to in each case one of the nodes 510 of the first node layer 521 of the autoencoder 500. Data are thereby input into the autoencoder 510. The autoencoder 502 comprises an encoding region 530 that comprises the first two node layers 521, 522 of the autoencoder 500. Here, each of the nodes 510 of the first node layer 521 is connected to each of the nodes 510 of the second node layer 522.

A code region 540, which consists of a node layer 523, adjoins the encoding region 530. Here, each node 510 of the second layer 522 of the encoding region 530 is in turn connected to each node of the code layer 523 of the code region 540.

Adjoining the code region 540, the autoencoder structure 102 has a decoding region 550, which in turn consists of two node layers 524, 525. The last of the node layers 525 is in turn connected to data fields 571, 572, 573, 574 of an output data vector 570.

The autoencoder 502 may then, for example, be trained such that an input dataset 560, for example, comprising position values of valves 310, 320, 322, 324, 330, 335, 370, 360, 340, 350 and sensors 410, 420, 430, 440, 450 of the media system 102, is input into the first node layer 521 of the encoding region 530 and the parameters of the nodes 510 and node connections of the autoencoder 500 are then adjusted, using one of the learning methods applicable to or typical for autoencoders, such that the output data vector 570 that is output by the last node layer 525 of the decoding region 550 corresponds to the input data vector 560, or at least approximately corresponds to the input data vector 560. Such typical learning methods are, for example, what is known as the backwards propagation of errors (backpropagation) method, conjugated gradient methods, what is known as a restricted Boltzmann machine mechanism, or comparable mechanisms or combinations thereof. Parameters of a neural network that are determined during training may be, for example, a weighting of a node connection or of an input value for a node (weight), a bias value for a node (bias), an activation function for a network node or parameters of such an activation function (for example, sigmoid function, logistic function, and/or activation function) and/ or an activation threshold for a network node or comparable parameters.

The above-described learning method for the autoencoder 500 illustrated in FIG. 4 is one example of what is known as unsupervised learning.

A neural network 502 in accordance with the disclosed embodiments may, for example, alternatively also comprise a network structure for supervised learning. By way of example, network structures for supervised learning and unsupervised learning may also be combined. By way of example, the ML model 502 illustrated in these figures may comprise a neural network with an autoencoder structure, as is illustrated for example in FIG. 4, and/or a plurality of further network structures. Here, the autoencoder structure may deviate from the example of an autoencoder structure 502 illustrated in FIG. 4, both in terms of the number of nodes respectively involved and the dimensionality of the node layers, and in terms of the number of node layers.

The autoencoder structure illustrated in FIG. 4 is one example of what is known as a deep autoencoder 502, because not all of the nodes 510 of the autoencoder 502 are connected to an input or output of the autoencoder structure 502, and there are thus what are known as "hidden layers".

Very generally speaking, autoencoder structures 502 may have, for example, a structure symmetrical with respect to the code region. Here, for example, the number of nodes 510 per node layer 521, 522, 523, 524, 525 may furthermore decrease from the input side toward the code region, in each case layer by layer, and then increase toward the output side, again layer by layer. The layer 523 or layers in the code region thereby then has a minimum number of nodes 510 in the context of the autoencoder structure 502. The autoencoder 502 illustrated in FIG. 4 is one example of such a symmetrical autoencoder 502 as described above.

Figure 5:
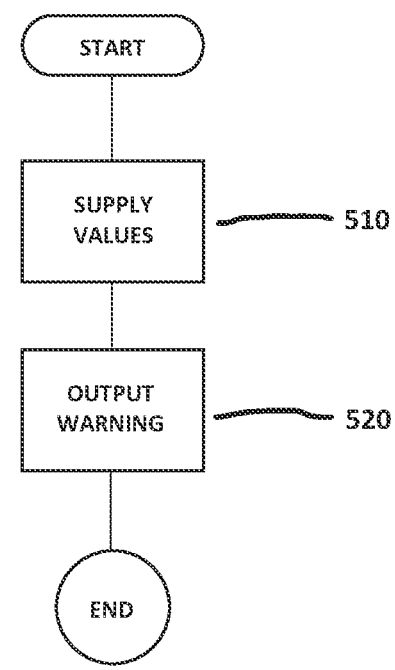
FIG. 5 is a flowchart of the method in accordance with the invention.

FIG. 5 is a flowchart of the method for monitoring a vulcanization process of a vehicle tire 116, 126 in a tire heating press 100, where at least one of at least one sensor value and at least one control variable of the tire heating press 100 are acquired.

The method comprises supplying at least one of the at least one sensor value and the at least one control variable to an evaluation device 138, 500 comprising an ML model 502 which is configured via a machine learning method, as indicated in step 510.

Next, the evaluation device 138, 500 and/or the ML model 502 output a warning notification when an evaluation of at least one of the at least one sensor value and the at least one control variable by the evaluation device 138, 500 reveals either (i) the existence of a defect or an anomaly with either the tire heating press 100 or at least part of the tire heating press 100, or (ii) a defect or an anomaly with either the tire heating press 100 or at least part of the tire heating press 100 will occur in the foreseeable future, as indicated in step 520.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for monitoring a vulcanization process of a vehicle tire in a tire heating press, at least one of at least one sensor value and at least one control variable of the tire heating press being acquired, the method comprising:
supplying at least one of the at least one sensor value and the at least one control variable to an evaluation device comprising an ML model configured via a machine learning method;
outputting, by at least one of the evaluation device and the ML model, a warning notification when an evaluation of at least one of the at least one sensor value and the at least one control variable by the evaluation device reveals one of (i) existence of a defect or an anomaly with one of the tire heating press and at least part of the tire heating press and (ii) a defect or an anomaly with one of the tire heating press and at least part of the tire heating press will occur in a foreseeable future.

2. The method as claimed in claim 1, wherein the tire heating press comprises an elastic bladder which is configured to support a vulcanization process of a vehicle tire located in the tire heating press.

3. The method as claimed in claim 2, wherein at least one of the evaluation device and the ML model is additionally configured such that a warning notification is output when an evaluation of the at least one of the at least one sensor value and the at least one control variable by the evaluation device, via the ML model, reveals one of (i) existence of an anomaly or a defect with the bladder and (ii) an anomaly or a defect with the bladder will occur in the foreseeable future.

4. The method as claimed in claim 2, wherein the tire heating press comprises at least one feed valve for regulating the feed of a gas or a liquid to the bladder and at least one discharge valve for regulating transportation of the gas or the liquid out of the bladder;
   wherein at least one of the at least one sensor value is delivered by a position sensor of the at least one feed valve and/or is delivered by a position sensor of the at least one discharge valve; and
   wherein at least one of the at least one control variable comprises an actuation variable for the at least one feed valve and/or an actuation variable for the at least one discharge valve.

5. The method as claimed in claim 2, wherein at least one of the at least one sensor value is delivered by a bladder pressure sensor which is configured to measure an internal pressure in the bladder;
   wherein at least one of the at least one sensor value is delivered by a feed pressure sensor which is configured to measure a pressure in a feed line for the bladder; and
   wherein at least one of the at least one sensor value is delivered by a discharge pressure sensor which is configured to measure a pressure in a discharge line for the bladder.

6. The method as claimed in claim 2, wherein at least one of the at least one sensor value is delivered by a bladder temperature sensor which is configured to measure a temperature in the bladder;
   wherein at least one of the at least one sensor value is delivered by a feed temperature sensor which is configured to measure a temperature in a feed line for the bladder; and
   wherein at least one of the at least one sensor value is delivered by a discharge temperature sensor which is configured to measure a temperature in a discharge line for the bladder.

7. The method as claimed in claim 1, wherein all sensor values of the at least one sensor value are delivered by sensors of the tire heating press which are also required or utilized for an intended vulcanization process of a vehicle tire in the tire heating press.

8. The method as claimed in claim 1, wherein the tire heating press comprises a control device for controlling the vulcanization process; and
   wherein at least one of the at least one control variable comprises an actuation variable, output by the control device during the vulcanization process, for the tire heating press or a component of the tire heating press.

9. The method as claimed in claim 1, wherein the tire heating press comprises at least one of (i) a pressure sensor; wherein at least one of the at least one sensor value is delivered by the pressure sensor and (ii) a temperature sensor; and wherein at least one of the at least one sensor value is delivered by the temperature sensor.

10. The method as claimed in claim 1, wherein the evaluation device further comprises a simulation environment which is configured to execute a simulation program for one of (i) simulating the tire heating press and (ii) simulating parts or components of the tire heating press.

11. The method as claimed in claim 1, wherein the ML model comprises a neural network which has been trained with at least one of sensor values and control variables.

12. The method as claimed in claim 11, wherein the neural network comprises an autoencoder structure which has been trained with at least one of sensor values and control variables via an unsupervised learning method.

13. The method as claimed in claim 12, wherein the neural network has a deep learning architecture and has been trained with at least one of (i) sensor values and (ii) control variables via a supervised learning method.

14. The method as claimed in claim 11, wherein the neural network has a deep learning architecture and has been trained with at least one of (i) sensor values and (ii) control variables via a supervised learning method.

15. The method as claimed in claim 1, wherein the ML model comprises one of (i) a support vector machine, (ii) a gradient boosted tree model and (iii) a random forest model, each of which have been configured utilizing at least one of sensor values and control variables.

16. The method as claimed in claim 1, wherein the evaluation device comprises a simulation environment with a simulation program for one of (i) simulating the tire heating press and (ii) simulating parts or components of the tire heating press.

17. An evaluation device for monitoring a vulcanization process of a vehicle tire in a tire heating press, the tire heating press being configured to acquire at least one of at least one sensor value and at least one control variable of the tire heating press, the evaluation device comprising:
   an ML model configured via a machine learning method;
   wherein the evaluation device is configured to receive at least one of the at least one sensor value and the at least one control variable; and
   wherein at least one of the evaluation device and the ML model are further configured such that a warning notification is output when an evaluation of at least one of (i) the at least one sensor value and (ii) the at least one control variable by the evaluation device, via the ML model, reveals one of (i) existence of a defect or an anomaly with one of the tire heating press and at least part of the tire heating press and (ii) a defect or an anomaly with one of the tire heating press and at least part of the tire heating press will occur in a foreseeable future.

18. The evaluation device as claimed in claim 17, wherein the tire heating press further comprises an elastic bladder which is configured to support a vulcanization process of a vehicle tire located in the tire heating press.

19. The evaluation device as claimed in claim 18, wherein the evaluation device is designed and configured to:
   receive at least one of the at least one sensor value and the at least one control variable; and
   output a warning notification when an evaluation of at least one of the at least one sensor value and the at least one control variable by the evaluation device reveals one of (i) the existence of the defect or the anomaly with one of the tire heating press and at least part of the tire heating press and (ii) the defect or an anomaly with one of the tire heating press and at least part of the tire heating press will occur in the foreseeable future.

20. The evaluation device as claimed in claim 17, wherein the evaluation device is designed and configured to:
   receive at least one of the at least one sensor value and the at least one control variable; and
   output a warning notification when an evaluation of at least one of the at least one sensor value and the at least one control variable by the evaluation device reveals one of (i) the existence of the defect or the anomaly with one of the tire heating press and at least part of the tire heating press and (ii) the defect or an anomaly with one of the tire heating press and at least part of the tire heating press will occur in the foreseeable future.

21. A tire heating press for vulcanizing vehicle tires, wherein the tire heating press comprises an elastic bladder configured to support a vulcanization process of a vehicle tire located in the tire heating press; wherein the tire heating press is further configured to acquire at least one of at least one sensor value and at least one control variable of the tire heating press, and wherein the tire heating press comprises the evaluation device as claimed in claim 17.

* * * * *